United States Patent [19]
Fedorovsky et al.

[11] 3,757,196
[45] Sept. 4, 1973

[54] SYNCHRONIZED TRANSISTOR CONVERTER

[76] Inventors: Anatoly Evgenievich Fedorovsky, ulitsa Mira, 17b, kv. 105; Evgeny Mikhailovich Ivanjushkin, ulitsa Kurchatova 15, kv. 125, both of Obninsk Kaluzhskoi oblasti, U.S.S.R.

[22] Filed: July 10, 1972

[21] Appl. No.: 270,282

[52] U.S. Cl. .............................. 321/45 R, 321/66
[51] Int. Cl. ..................................... H02m
[58] Field of Search ................. 321/45 R, 66, 69 R

[56] References Cited
UNITED STATES PATENTS

| | | | |
|---|---|---|---|
| 3,089,992 | 5/1963 | Seney | 321/69 R |
| 3,246,231 | 4/1966 | Clarke | 321/69 R |
| 3,341,766 | 9/1967 | Rhyne | 321/45 R |
| 3,441,832 | 4/1969 | Leu | 321/45 R |
| 3,636,432 | 1/1972 | Sherman | 321/45 R |

*Primary Examiner*—William H. Beha, Jr.
*Attorney*—John C. Holman and Marvin R. Stern

[57] ABSTRACT

A synchronized transistor current converter is disclosed, the converter comprising four transistors arranged in a bridge configuration with a load connected across its two diagonally opposed junctions and controlled by signals applied to the bases of the four transistors from three transistor triggers, two of which initiate and terminate conduction in two collector-connected transistors of the bridge configuration. The emitter of one transistor of the above two triggers is connected to the base of a respective bridge circuit transistor, while the collector of the other trigger transistor is coupled to independent supply sources provided for the triggers. The third trigger, supplied from an independent power source, controls conduction in the two other transistors of the bridge configuration with their emitters interconnected, the bases coupled to the emitters of the respective transistors of the trigger, and the collectors connected through capacitors with the bases of the respective transistors of the two other triggers, with the collectors thereof coupled to the independent supply sources provided for these triggers.

1 Claim, 8 Drawing Figures

3,757,196

SYNCHRONIZED TRANSISTOR CONVERTER

BACKGROUND OF THE INVENTION

The present invention relates to electrical converting apparatus and more particularly to synchronized transistor converters.

A known synchronized transistor converter comprises four transistors arranged in a bridge configuration with a load connected to the two diagonally opposed junctions of the bridge configuration and controlled by signals applied to their bases from individual control elements one of which receives a sync pulse (see, for example, British Patent No. 954601, class H2F9)

In this known converter the independent control elements for initiating and terminating conduction in the synchronized transistors of the bridge circuit are interconnected devices incorporating charging capacitors, semiconductor elements which control capacitor charging, and transformers receiving control pulses from an external source of appropriately phased pulses.

With such an arrangement of independent control elements, the disadvantages of this known converter lie in that the synchronizing circuit is highly complicated, the conversion frequency depends on the time constants of the charging capacitor circuits and cannot be varied within broad limits in the course of converter operation.

SUMMARY OF THE INVENTION

It is an object of the invention to provide a synchronized transistor converter in which the conversion frequency is independent of the circuit elements and can be varied throughout a wide range in the course of converter operation, and which ensures higher stability of the output amplitude.

With this object in view, the invention resides in a synchronized transistor converter comprising four transistors arranged in a bridge configuration with a load connected across two diagonally opposed terminals of the bridge and controlled by signals applied to their bases from individually controlled elements, one of which receives a sync pulse, wherein, according to the invention, the independent control elements for initiating and extinguishing conduction in the synchronized transistors of the bridge configuration are three transistor triggers, two of which control two collector-coupled transistors in the bridge circuit, the emitter of one trigger transistor being connected with the base of a corresponding transistor in the bridge configuration, and the collector of the other trigger transistor coupled to the independent supply sources of the above two triggers; the third trigger supplied from its independent power source initiates conduction in the remaining pair of transistors in the bridge circuit with the emitters of the transistors interconnected, the bases coupled to the emitters of corresponding trigger transistors and the collectors connected through capacitors with the bases of corresponding transistors of the two other triggers, the collectors thereof being connected to the independent supply sources of these triggers.

The synchronized transistor converter of the present invention, intended for changing D.C., into A.C. and A.C. into D.C. is capable of providing the conversion frequency which is independent of the magnitude of load current and the type of load, a wider conversion frequency range and continuous control of the conversion frequency within broad limits in the course of operation.

BRIEF DESCRIPTION OF THE DRAWINGS

The invention will become more readily apparent from the following detailed description of exemplary embodiments thereof illustrated in the accompanying drawings, in which.

FIG. I illustrates schematically a synchronized transistor converter of the invention.

DETAILED DESCRIPTION OF PREFERRED EMBODIMENT

Figure 1:
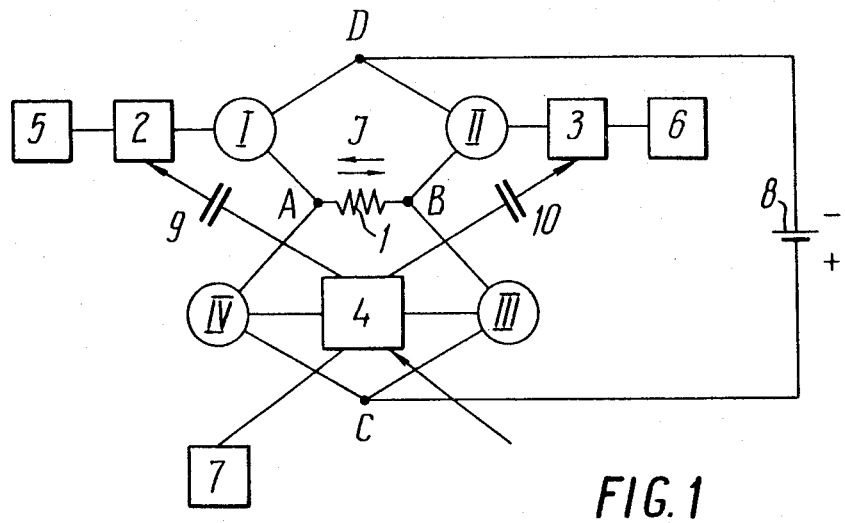

The synchronized transistor converter comprises a load 1 (FIG. 1) connected across the junctions A and B of the bridge circuit composed of four transistors 1, 11, III and IV controlled by triggers 2, 3 and 4 with independent D.C. supply sources 5, 6 and 7 (for illustration purposes, sources 5, 6, 7 are shown as separate units in the drawing).

When the transistors I and III are conducting, and the transistors II and IV are cut off, current $\tau$ in the load 1 connected across the junctions A and B of the bridge configuration flows in the circuit DABC from the voltage of a battery 8 with its positive pole connected to the point "C" and the negative pole, to the point "D," and then reverses its direction when the transistors I and III become cut-off and the transistors II and IV become conducting.

For initiating and extinguishing conduction in the transistors I, II, III and IV and for synchronizing these operations, sync pulses of an appropriate amplitude and length are furnished from a pulse source (not shown) to the trigger 4 at a frequency that can be selected throughout a wide range.

The trigger 4 is connected through capacitors 9 and 10 with the triggers 2 and 3 consequently each pair of the transistors I, III and II, IV can alternately start or terminate conduction at the same time, while the control triggers 2, 3 and 4 and their supply sources 5, 6 and 7 remain D.C.-decoupled.

Figure 2:
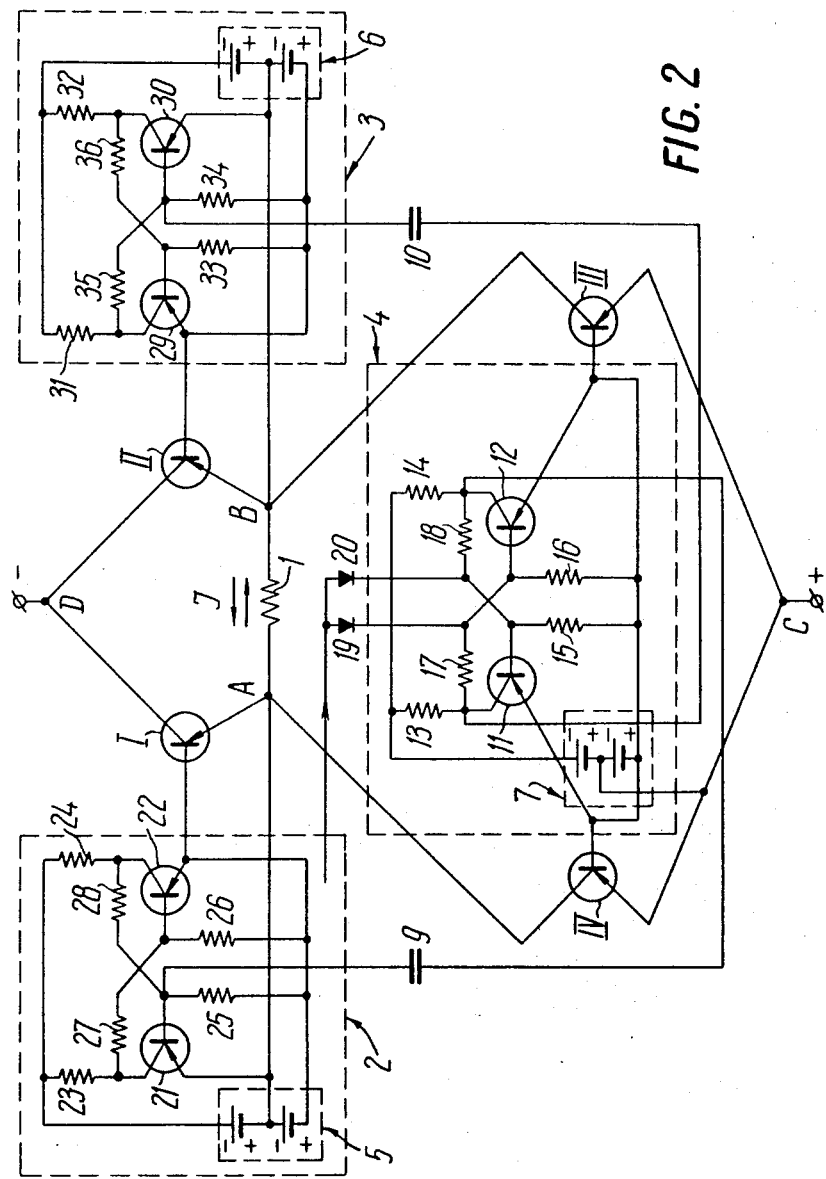
FIG. 2 is a circuit diagram of a synchronized transistor converter of the invention.

The electric circuitry assembled in accordance with the schematic diagram in FIG. 1 comprises transistors III and IV (FIG. 2) intercoupled by their emitters and controlled by a trigger 4 employing transistors 11 and 12.

The collectors of the transistors 11 and 12 are connected through resistors 13 and 14 to the negative pole of a collector supply source included in an independent power supply source 7 of the trigger 4. The bases of the transistors 11 and 12 are connected through resistors 15 and 16 to the positive pole of a base bias source also included in the independent supply source 7. The emitters of the transistors 11 and 12 are connected to the positive pole of the base bias supply source, the collector of the transistor 11 being coupled through a resistor 17 with the base of the transistor 12, and the collector of the transistor 12 through a resistor 18 with the base of the transistor 11. The common point of the collector supply and base bias sources is connected to the junction C of the bridge configuration.

Coupling of the transistors III and IV of the bridge with the trigger 4 is accomplished through connection of the bases of the transistors III and IV to the emitters of the transistors 12 and 11 of the trigger 4.

The trigger 4 is controlled by a sync pulse delivered through diodes 19 and 20 with the cathodes thereof connected to the bases of the transistors 12 and 11, respectively.

The collector-coupled transistors I and II in the bridge configuration are controlled by triggers 2 and 3. The trigger 2 is built around transistors 21 and 22, the emitter of the transistor 22 being connected to the base of the transistor 1 of the bridge circuit, and the emitter of the transistor 21, to the common point of the collector supply source and the base bias source included in the independent supply source 5 feeding the trigger 2. The trigger 2 also includes resistors 23, 24, 25, 26, 27 and 28.

The trigger 3 uses transistors 29 and 30 and includes resistors 31, 32, 33, 34, 35 and 36 connected into the collector and base circuits of the above transistors 29 and 30 in the same way as the resistors of the triggers 2 and 4. The emitter of the transistor 29 is connected with the base of the bridge transistor 11, and the emitter of the transistor 30, with the common point of the collector supply source and the base bias source included in the independent supply source 6 feeding the trigger 3.

A peculiar feature of the converter is the use of the blocking capacitors 9 and 10 which prevent simultaneous initiation of conduction in the transistors of one arm of the bridge circuit. The blocking capacitors 9 and 10 which provide operational reliability to the converter are connected between the collectors of the transistors 11 and 12 (trigger 4) and the bases of the corresponding transistors 21 and 30 (triggers 2 and 3).

The synchronized transistor converter of the present invention can perform different functions depending on the bridge terminals across which the voltage is supplied, the type of voltage (A.C. or D.C.) applied thereto, and the frequency of the sync pulses controlling operation of the transistors I, II, III and IV.

When D.C. voltage is applied between the junctions C and D of the bridge circuit and the load 1 is connected across the terminals A and B, it is recommended the proposed converter be used as a precision square-wave generator.

Figure 3:
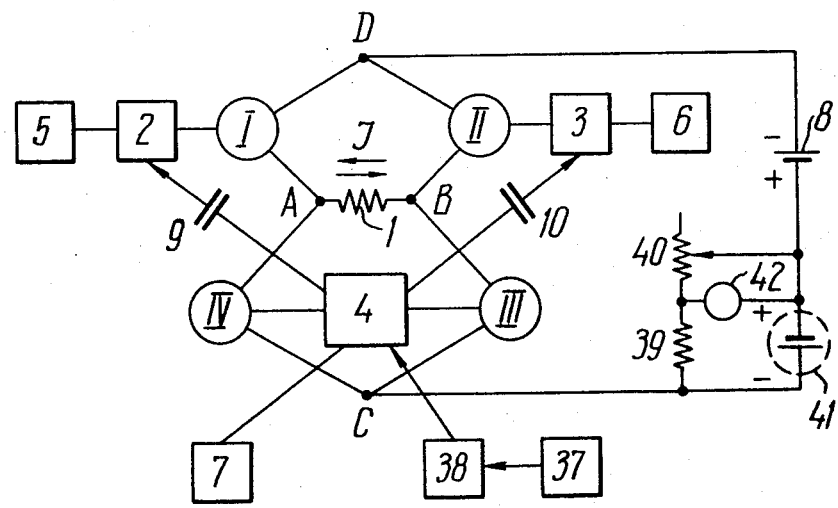
FIG. 3 depicts schematically a current converter of this invention used as a precision square-wave generator.

High accuracy and stability of the square-wave current obtained in the load 1 are ensured by switching the transistors I, II, III and IV in the bridge circuit by means of sync pulses produced by a crystal-controlled oscillator 37 (FIG. 3). The oscillator 37 is connected to the trigger 4 through a frequency divider 38. In such an arrangement, the accuracy of setting the length of a square wave in the load 1 will depend on the frequency stability of the crystal oscillator 37.

For setting and measuring the amplitude of current $\tau$ in the load 1, the oscillator comprises a circuit composed of a standard resistor 39 in series with a variable resistor 40 shunted by a standard cell 41 with the positive pole thereof connected to the positive pole of the battery 8. The midpoint of the resistors 39 and 40 is connected through a null-galvanometer 42 with the positive pole of the standard cell 41, the negative pole of the latter being coupled with the bridge junction C.

The proposed converter operates as follows.

Consider, for example, the state when the transistors II (FIG. 2) and IV are conducting, while the transistors I and III are cut off. When the transistor 11 driven into conduction simultaneously with the transistor IV is rendered non-conducting by a positive sync pulse applied through the diodes 19 and 20 to the bases of the transistors 11 and 12 of the trigger 4, and the transistor 12 (simultaneously with the transistor III) is triggered into conduction by the same pulse, the negative collector output of the transistor II goes via the capacitor 10 to the base of the transistor 30 to initiate conduction in the transistor 30 and cut off thereby the transistor 29 and the transistor II. The positive pulse from the collector of the transistor 12 is supplied through the capacitor 9 to the base of the transistor 21, renders it non-conducting and triggers into conduction the transistor 22 and the transistor I.

Since the base of the transistor 21 remains connected to zero potential through the capacitor 9 after the transistor IV has ceased conduction, the negative voltage set up at the point A and in the emitter of the transistor 21, drives the transistor 21 still further towards cut-off and the transistor 22 and the transistor I towards conduction, maintaining the bridge circuit in its new state.

Similarly, the positive voltage pulse appearing at the point B and in the emitter of the transistor 30, when the transistor III starts to conduct, triggers the transistor II to the non-conducting state. The next sync pulse causes the entire action to repeated at the reverse polarity of the cut-off pulses and with the triggers 2, 3, 4 operating in the reverse order.

To make the forward and back currents in the diagonal AB of the bridge exactly equal ( $+\tau = -\tau$ ), the transistors I, II, III and IV must have the same forward resistance. At the same time, the operating characteristics of the transistors I, II, III and IV and those of the control triggers 2, 3, 4 are selected so as to meet the condition $i_1 \cdot \beta >> i_2$, where $i_1$ is the transistor base current; $i_2$ the collector current; $\beta$ the current gain. In this mode, current in the bridge circuit is little affected by variations in the base bias voltage.

When the converter is used as a precision current and voltage generator, it operates in the same manner with the only difference being that in order to provide high accuracy and stability of the square current wave across the load 1 (FIG. 3), the converter uses a crystal oscillator 37 connected to the trigger 4 through a frequency divider 38 and incorporates also a circuit composed of a standard resistor 39, variable resistor 40, null-galvanometer 42 and a standard cell 41.

When voltage at the standard cell 41 equals the voltage drop caused by current τ at the resistor 39, the null-galvanometer 42 reads zero. Thus, with the aid of the variable resistor 40, current τ flowing through the load 1 can be set with an accuracy known for the voltage of the standard cell 41, i.e. about 0.01 percent.

Such an accurate setting of the amplitude of the square-wave current τ in the load 1 is attainable if the resistors I, 39 and 40 are precision resistors and if the forward resistance of each conducting transistor I, II, III, IV is much smaller than the total resistance of the resistors I, 39, 40.

When the generator, depicted in FIG. 3, is used as a voltage generator, it is advisable to use a decade attenuator as the load 1, with its output variable in steps from zero to the product of the current τ and the resistance of the load 1.

The synchronized transistor converter of the present invention is capable of performing various functions depending on the terminals of the bridge configuration to which the voltage is supplied, voltage (A.C. or D.C.) applied thereto and the frequency of the sync pulses controlling the operation of the transistors I, II, III and IV.

Figure 4:
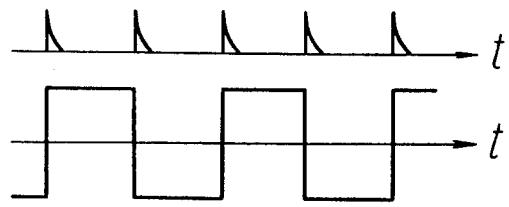
FIG. 4 shows the waveforms of control sync pulses and load current in the proposed converter when used as a precision square-wave generator.

If D.C. voltage is supplied across the junctions C and D of the converter bridge circuit shown in FIG. 3 and the load is connected between the junctions A and B, the diagonal AB produces square current pulses the waveform of which is illustrated in FIG. 4 together with the waveform of control sync pulses (the pulses are represented on the time axis $t$). The operation of the converter in this case is described above.

With A.C. voltage applied across the terminals A and B of the bridge configuration and the load connected across the terminals C and D, one transistor state passes a positive half-wave, and the reverse state, a negative half-wave.

If the transistors are switched over at an A.C. voltage frequency and the phase shift is zero, both half-waves will pass into the load. At a 180° phase shift, the load current will be zero.

Figure 5:
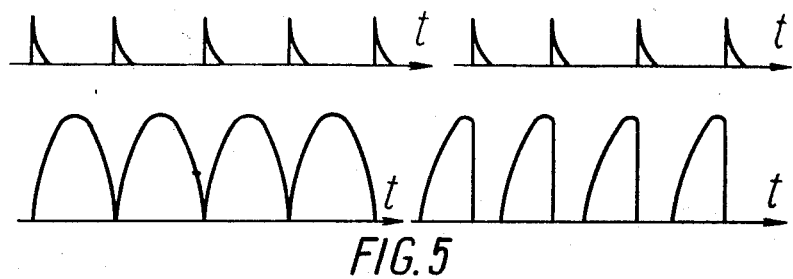
FIG. 5 illustrates the same in the proposed converter used as a full-wave rectifier with a controllable conduction angle.

Thus, in this embodiment of the invention, the circuit functions as a full-wave rectifier with a variable conduction angle. The waveforms of the control sync pulses and the load current of such a converter are given in FIG. 5. The proposed converter has a higher efficiency when compared with conventional thyristor circuits, because the forward resistance of a transistor is lower than the forward resistance of a thyristor of the same current rating.

Figures 6, 7:
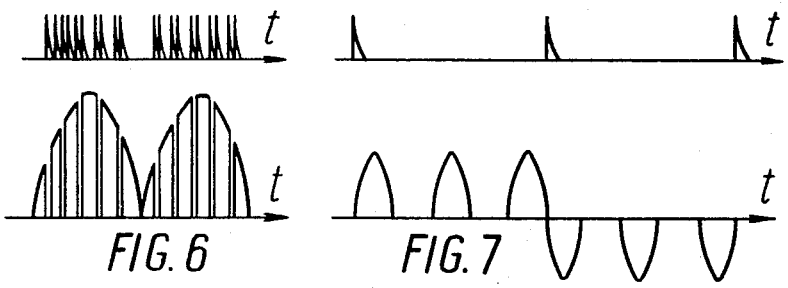
FIG. 6 shows corresponding waveforms with the load connected across the terminals C and D of the bridge configuration and alternating voltage applied between the bridge junctions A and B at a sync pulse frequency which is much higher than that of the rectified load current.
FIG. 7 also shows corresponding waveforms with the load connected across the terminals A and B of the bridge configuration and alternating voltage applied between the bridge terminals C and D.

In still another version of converter operation, the load is connected across the terminals C and D of the bridge, A.C. voltage is applied across the terminals A and B, but the sync pulse frequency is much higher than the frequency of the rectified load current. The load will then give out short current pulses modulated by the A.C. voltage applied between the terminals A and B. The waveform of these pulses together with the waveform of control sync pulses is illustrated in FIG. 6.

When A.C. voltage is connected across the terminals C and D of the bridge configuration, the load coupled between the terminals A and B will pass only one half-wave, whatever the state of the bridge transistors. The direction of load current, however (the waveforms are given in FIG. 7), will depend on which pair of transistors is conducting at that time. If the transistor switchover frequency is very low or zero, the converter will function as a half-wave rectifier wherein the load current direction will be reversed by incoming sync pulses (i.e., producing a rectifier-inverter action).

Figure 8:
FIG. 8 illustrates again the corresponding waveform, when the sync pulse frequency appreciably exceeds that of the alternating load current.

If in this embodiment of the invention, the sync pulse frequency is much above the A.C. frequency, the converter will send to the load trains of sine-wave-modulated signals as shown in FIG. 8 for the load current and control sync pulses.

The proposed synchronized transistor converter can be used as a wide-range D.C./A.C. converter applicable in the industry for current measurement, high-frequency electrothermics and in electric power equipment.

The converter can also be employed as a full-wave rectifier with a variable conduction angle for non-contact control of the power of electric heaters and commutator motors; as a half-wave rectifier-inverter for electric actuators and automatic equipment; as a source of modulated trains of pulses for radio measurements and radiotelegraphy, and as a precision square-wave current and voltage generator for calibrating special-purpose radio equipment.

By virtue of its design features, the synchronized transistor converter of the present invention possesses a number of advantages over known devices intended for similar applications: in the operation of the instrument as a D.C./A.C. converter, the conversion frequency does not depend on the type of load and the magnitude of current and can be controlled continuously within wide limits in the course of operation; when used as a full-wave rectifier, the converter provides independent control of both firing and extinguishing angles and a higher efficiency. The converter functioning as a source of trains of modulated signals has a higher useful output (high efficiency). Finally, in the capacity of a precision square-wave generator, the converter ensures the accuracy of the output voltage characteristics one order higher than that of conventional devices.

An experimental synchronized transistor converter acting as a precision square-wave voltage generator provides the square wave length accurate to within 0.01%, the amplitude setting accuracy of 0.01 percent and current generation efficiency of about 80 percent. Other important advantages are that it produces voltage pulses with a much shorter rise time, a considerably larger load current amplitude, and has an appreciably wider range of generated frequencies.

What is claimed is:

1. A synchronized transistor converter, comprising: four transistors arranged in a bridge configuration and having bases, emitters and collectors; a load connected across two diagonally opposed terminals of said bridge configuration; three independent control trigger means including transistors for initiating and extinguishing conduction in said transistors; said transistors of said triggers having bases, emitters and collectors; independent supply source means for said trigger means; two of said trigger means being connected to control two of the bridge transistors, which transistors have their collectors interconnected; one transistor of each of said two trigger means having the emitter thereof coupled to the base of a respective transistor in said bridge configuration; a second transistor of each said two trigger means having the collector thereof connected to said independent supply source means of said respective trigger means; a third of said trigger means being connected to control conduction in two other transistors of said bridge configuration which transistors have their emitters interconnected; two of said transistors of said bridge configuration with interconnected emitters also having their bases coupled to said emitters of the respective transistors of said third trigger means; two capacitors connected between the collectors of said transistors of said third trigger means and the bases of the respective transistors of said two other trigger means with the collectors thereof being coupled to said independent supply source means of the respective trigger means; and a synchronizing generator electrically coupled with one of said trigger means.

* * * * *